US012445764B2

(12) United States Patent
Starnes et al.

(10) Patent No.: US 12,445,764 B2
(45) Date of Patent: Oct. 14, 2025

(54) COMPRESSION DRIVER WIDE BAND MICROSPEAKER

(71) Applicant: Google LLC, Mountain View, CA (US)

(72) Inventors: Mark William Starnes, Sunnyvale, CA (US); Anthony King, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/562,528

(22) PCT Filed: Oct. 24, 2022

(86) PCT No.: PCT/US2022/047528
§ 371 (c)(1),
(2) Date: Nov. 20, 2023

(87) PCT Pub. No.: WO2024/091215
PCT Pub. Date: May 2, 2024

(65) Prior Publication Data

US 2025/0088790 A1 Mar. 13, 2025

(51) Int. Cl.
*H04R 7/04* (2006.01)
*H04R 1/28* (2006.01)
(Continued)

(52) U.S. Cl.
CPC ............. *H04R 1/2811* (2013.01); *H04R 7/04* (2013.01); *H04R 7/18* (2013.01); *H04R 9/045* (2013.01); *H04R 9/06* (2013.01); *H04R 2400/11* (2013.01)

(58) Field of Classification Search
CPC .......... H04R 1/2811; H04R 7/04; H04R 7/18; H04R 9/045; H04R 9/06; H04R 2400/11
(Continued)

(56) References Cited

U.S. PATENT DOCUMENTS 8,824,718 B2 * 9/2014 Held ...................... H04R 1/345
381/337
10,771,892 B1 * 9/2020 Morozov ............... G01V 1/133
(Continued)

FOREIGN PATENT DOCUMENTS

| | | |
|---|---|---|
| EP | 3531713 | 8/2019 |
| GB | 2408405 | 5/2005 |
| GB | 2463529 | 3/2010 |

OTHER PUBLICATIONS

International Preliminary Report on Patentability in International Appln. No. PCT/US2022/047528, mailed on May 8, 2025, 7 pages.
(Continued)

*Primary Examiner* — Suhan Ni
(74) *Attorney, Agent, or Firm* — Fish & Richardson P.C.

(57) ABSTRACT

A microspeaker includes a frame defining a space; and an actuator positioned within the space, the actuator including a diaphragm configured to vibrate in a first direction during operation. A center axis of the diaphragm extends in the first direction. A plate assembly mechanically couples to the frame and defines a path for venting fluid from the space. The plate assembly includes: a first plate extending in a plane and defining first apertures that are offset from the center axis in the plane; and a second plate defining a second aperture intersected by the center axis. The second plate includes: an inner recessed region abutting the second aperture; and an outer non-recessed region. The first plate is mechanically coupled to the second plate, the first plate and the inner region of the second plate defining a channel that fluidly couples the first apertures to the second aperture.

20 Claims, 9 Drawing Sheets

(51) Int. Cl.
*H04R 7/18* (2006.01)
*H04R 9/04* (2006.01)
*H04R 9/06* (2006.01)

(58) Field of Classification Search
USPC .................................................. 381/337, 347
See application file for complete search history.

(56) References Cited

U.S. PATENT DOCUMENTS

| | | | | |
|---|---|---|---|---|
| 11,265,645 | B2 | 3/2022 | Pavlov et al. | |
| 2015/0163572 | A1* | 6/2015 | Weiss | H04R 1/02 381/337 |
| 2017/0195796 | A1 | 7/2017 | Salvatti et al. | |
| 2021/0044893 | A1* | 2/2021 | Park | H04R 1/345 |
| 2023/0232168 | A1* | 7/2023 | Qi | G10K 11/22 381/345 |

OTHER PUBLICATIONS

Csanyi, "What is the complex power and how it figures in power analysis," Mar. 17, 2017, retrieved on Jun. 4, 2024, retrieved from URL <https://electrical-engineering-portal.com/complex-power-analysis>, 13 pages.
International Search Report and Written Opinion in International Appln. No. PCT/US2022/047528, mailed Jun. 23, 2023, 12 pages.
Kolbrek, "Horn Theory: An Introduction, Part 1," audioXpress, retrieved from URL <https://www.grc.com/acoustics/an-introduction-to-horn-theory.pdf>, 2008, 1-8.
usound.com [online], "USound's MEMS speakers extreme bandwidth technology," Mar. 17, 2021, retrieved Jun. 4, 2024, retrieved from URL <https://www.usound.com/usounds-mems-speakers-extreme-bandwidth-technology/>, 3 pages.
Woodford, "Directional loudspeakers," Nov. 3, 2020, retrieved on Jun. 4, 2024, retrieved from URL <https://www.explainthatstuff.com/directional-loudspeakers.html>, 9 pages.

* cited by examiner

COMPRESSION DRIVER WIDE BAND MICROSPEAKER

CROSS-REFERENCE TO RELATED APPLICATION

This application is a National Stage Application under 35 U.S.C. § 371 and claims the benefit of International Application No. PCT/US2022/047528, filed Oct. 24, 2022, the disclosure of which is incorporated herein by reference.

TECHNICAL FIELD

This specification relates generally to audio speakers, and more specifically to microspeakers.

BACKGROUND

This specification relates to microspeakers. Electronic devices can present multimedia content including audio using speakers to provide tonal, voice-generated, or recorded output. Some speakers are designed to have a smaller physical size for simple integration into various electronic devices having a range of different sizes (e.g., mobile phones, smart home devices). Certain speakers can generate both audio and ultrasonic frequencies. Microspeakers are compact speakers. Some microspeakers can generate sound at ultrasonic frequencies. Sound emitted at ultrasonic frequencies can be used for various functions including range detection and facial recognition.

Microspeakers can include a port for venting air from a chamber of the microspeaker. The port may be positioned at a side of the microspeaker. When sound waves are emitted from the port with wavelengths that are approximately the same or smaller than the microspeaker dimensions, modal effects can occur in the chamber causing a lumpy response. For ultrasonic frequencies this can limit devices to a narrow band of frequencies for efficient operation.

SUMMARY

Disclosed are compression driver wide band microspeakers. The microspeakers can be used to produce sound waves at human audible frequencies and human inaudible frequencies (e.g., ultrasound frequencies). The microspeaker can be edge-tapped, with air tapped for venting from around a periphery of a diaphragm in a chamber of the microspeaker. The diaphragm can be configured to oscillate in a first, axial direction. A center axis of the microspeaker extends in the first direction. The air, in the form of a pressure wave, can be channeled inwards, away from edges of the microspeaker and towards the center axis of the microspeaker through an air path. The air path can steer the pressure wave at right angles to a single exit tube. The exit tube can be positioned at a top of the microspeaker, with the area of the exit tube intersected by the center axis of the microspeaker.

Compression driver wide band microspeakers can be used in a variety of devices having a microspeaker that performs ultrasonic emission and/or detection. For example, mobile telephones can use ultrasonic signals to assess objects in the external region to increase the robustness of face authorization and antispoof security measures.

In general, one innovative aspect of the subject matter described in this specification can be embodied in a microspeaker, including: a frame defining a space; and an actuator positioned within the space, the actuator including a diaphragm configured to vibrate in a first direction during operation of the actuator. A center axis of the diaphragm extends in the first direction. The microspeaker includes a plate assembly mechanically coupled to the frame and defining a path for venting fluid from the space. The plate assembly includes: a first plate extending in a plane orthogonal to the first direction, the first plate defining one or more first apertures, the one or more first apertures being offset from the center axis in the plane; and a second plate defining a second aperture intersected by the center axis, a first side of the second plate including: an inner region abutting the second aperture; and an outer region abutting the inner region, the inner region being recessed relative to the outer region. The first plate is mechanically coupled to the second plate with the first side of the second plate facing the first plate, the first plate and the inner region of the second plate defining a channel that fluidly couples the one or more first apertures to the second aperture.

In general, one innovative aspect of the subject matter described in this specification can be embodied in a mobile device including the microspeaker. In general, one innovative aspect of the subject matter described in this specification can be embodied in a wearable device including the microspeaker.

The foregoing and other embodiments can each optionally include one or more of the following features, alone or in combination. In some implementations, the path for venting fluid from the space includes: a first portion defined by the one or more first apertures; a second portion defined by the channel; and a third portion defined by the second aperture.

In some implementations, a direction of fluid flow in the first portion of the path is orthogonal to a direction of fluid flow in the second portion of the path.

In some implementations, a direction of fluid flow in the second portion of the path is orthogonal to a direction of fluid flow in the third portion of the path.

In some implementations, a center of the second aperture aligns with the center axis of the diaphragm in the first direction.

In some implementations, the direction of fluid flow in the channel is in an inward radial direction relative to the center axis.

In some implementations, a ratio between a total cross-sectional area of the one or more first apertures and a cross-sectional area of the second aperture is 0.9 or greater.

In some implementations, a ratio between a total cross-sectional area of the one or more first apertures and a cross-sectional area of the second aperture is 1.1 or less.

In some implementations, the second aperture has a radius of 1.5 mm or greater.

In some implementations, the second aperture has a radius of 2.0 mm or less.

In some implementations, the microspeaker includes a suspension suspending the diaphragm within the space relative to the frame.

In some implementations, the microspeaker includes: a coil positioned in the space with the frame extending around a perimeter of the coil, the coil being coupled to the diaphragm. During operation of the microspeaker, an electric current through the coil varies a relative displacement of the coil and of the diaphragm with respect to the frame in the first direction.

In some implementations, a bandwidth of the microspeaker includes frequencies of 400 Hz or greater.

In some implementations, a bandwidth of the microspeaker includes frequencies of 50 kHz or less.

In general, one innovative aspect of the subject matter described in this specification can be embodied in a frame assembly for a microspeaker. The frame assembly includes: a back plate extending in a plane; one or more side walls mechanically coupled to the back plate and extending in a first direction orthogonal to the plane, the back plate and the one or more side walls defining a space; and a plate assembly mechanically coupled to the one or more side walls and defining a path for venting fluid from the space, the plate assembly having a center axis that extends in the first direction. The plate assembly includes: a first plate extending parallel to the back plate and defining one or more first apertures, the one or more first apertures being offset from the center axis; and a second plate defining a second aperture intersected by the center axis, a first side of the second plate including: an inner region abutting the second aperture; and an outer region abutting the inner region, the inner region being recessed relative to the outer region. The first plate is mechanically coupled to the second plate with the first side of the second plate facing the first plate, the first plate and the inner region of the second plate defining a channel that fluidly couples the one or more first apertures to the second aperture.

In general, one innovative aspect of the subject matter described in this specification can be embodied in a microspeaker including the frame assembly.

In some implementations, the path for venting fluid from the space includes: a first portion defined by the one or more first apertures; a second portion defined by the channel; and a third portion defined by the second aperture.

In some implementations, a direction of fluid flow in the first portion of the path is orthogonal to a direction of fluid flow in the second portion of the path.

In some implementations, a direction of fluid flow in the second portion of the path is orthogonal to a direction of fluid flow in the third portion of the path.

In some implementations, a center of the second aperture aligns with the center axis of the plate assembly in the first direction.

In some implementations, each of the one or more first apertures has a width of 0.4 mm or less.

In some implementations, a direction of fluid flow in the channel is in an inward radial direction relative to the center axis.

In some implementations, a ratio between a total cross-sectional area of the one or more first apertures and a cross-sectional area of the second aperture is 0.9 or greater.

In some implementations, a ratio between a total cross-sectional area of the one or more first apertures and a cross-sectional area of the second aperture is 1.1 or less.

In some implementations, the second aperture has a circular shape.

In some implementations, the one or more first apertures are arranged to form a rectangular shape in the plane, each of the one or more first apertures forming a portion of a perimeter of the rectangular shape.

In some implementations, an outer edge of the inner region of the first side of the second plate aligns with an outer edge of the one or more first apertures in the first direction.

In some implementations, at the inner region, the second plate has a first thickness; and at the outer region, the second plate has a second thickness that is greater than the first thickness, a difference between the first thickness and the second thickness being 0.5 mm or less.

In some implementations, the second aperture has a radius of 1.5 mm or greater.

In some implementations, the second aperture has a radius of 2.0 mm or less.

Among other advantages, implementations feature microspeakers that produce audio signals at high sound pressure levels. The disclosed edge-tapped microspeakers can result in directional gains of 50 decibel sound pressure level (SPL), compared to a center-tapped microspeaker, and can produce a smoother response. Directing the pressure wave from an edge region towards the center before venting to atmosphere can improve flexibility in operating frequency of the microspeaker. The frequency band of the microspeaker can be extended, e.g., to a bandwidth of 400 Hz to 50 kHz. In some examples, an external horn can be coupled to the exit tube in order to improve efficiency and directivity control.

The improved frequency response can permit the microspeaker to produce higher volume sound in a smaller size container. The microspeaker can produce higher frequency audio waves at higher efficiency and sound pressure level (SPL). Microspeakers with compression drivers can be used in devices such as mobile phones and wearable and hearable products. The microspeakers improve efficiency, smoothness, and robustness over a large range of frequencies. Sound pressure nulls at high frequencies can be reduced or eliminated. The microspeakers can produce higher pressure amplitudes at lower temperatures, reducing operating temperatures of the microspeakers. The microspeakers can experience lesser displacement at higher pressure amplitudes, reducing harmonic distortion. The microspeakers can improve controlled directivity of sound waves.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
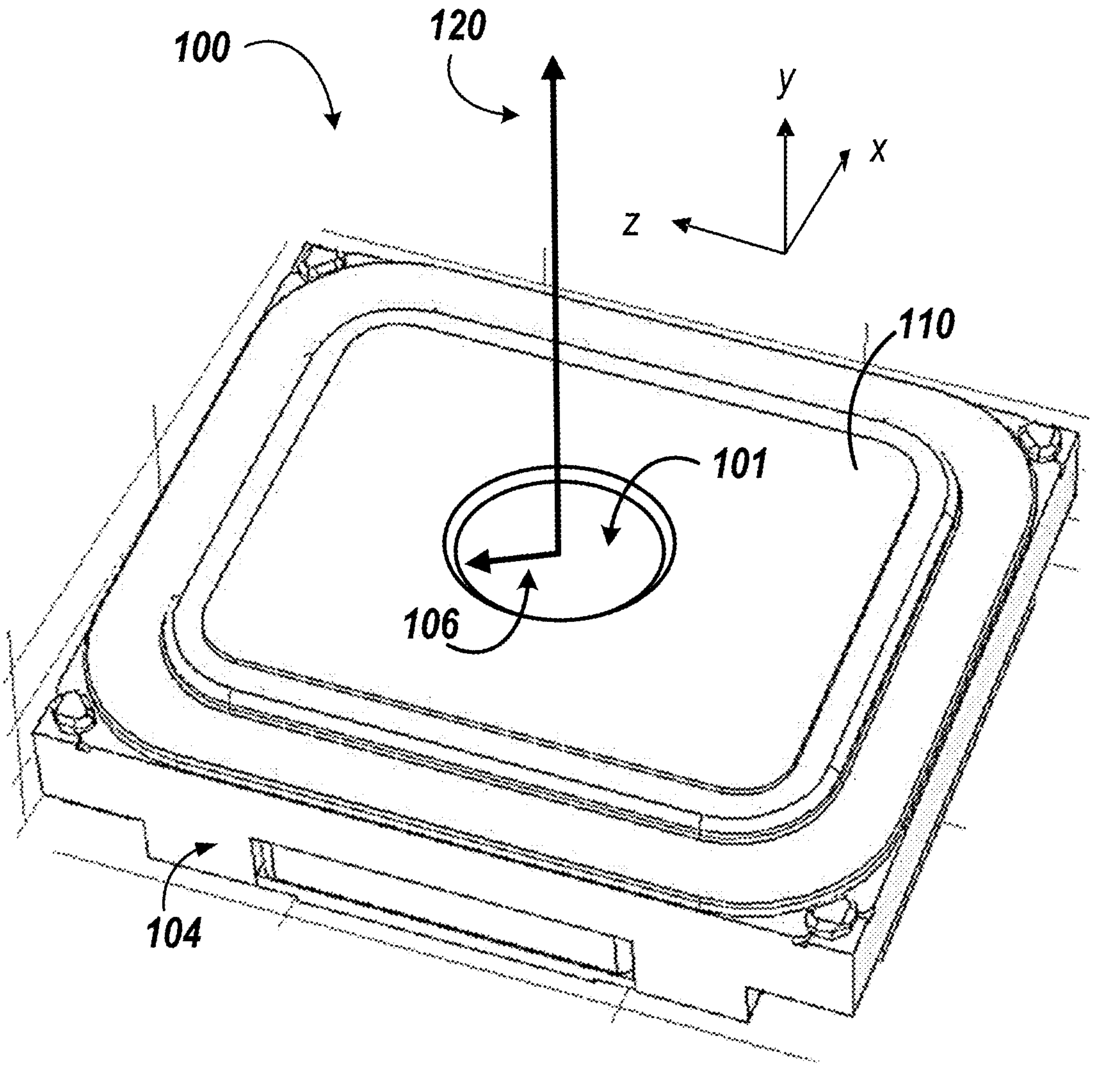
FIG. 1 is a perspective view of an example microspeaker.

FIG. 1 is a perspective view of an example microspeaker 100. The microspeaker 100 can include a compression driver actuator housed within a frame 104. The compression driver actuator is positioned below a top plate 110 of the microspeaker 100 in the y-direction. The compression driver includes a diaphragm, a magnet, and a coil. Components of the compression driver actuator are shown and described in greater detail with reference to FIG. 2. A compression driver is a small diaphragm loudspeaker that generates sound. The compression driver can be attached to an acoustic horn, e.g., a widening duct which serves to radiate the sound efficiently into the air. A compression driver can operate in a compression mode, in which the area of the loudspeaker diaphragm is larger than the throat aperture of the horn. This can increase the sound pressures achieved, improve directivity control, or both. Horn-loaded compression drivers can achieve very high efficiencies, e.g., up to approximately ten times the efficiency of direct-radiating cone loudspeakers.

The microspeaker 100 includes an exit tube 101 defined by the top plate 110 of the microspeaker 100. The exit tube 101 can function as a horn for the microspeaker 100. In some examples, the exit tube 101 is open to atmosphere. The exit tube 101 has a cross-sectional area that is smaller than an area of the diaphragm of the compression driver.

A Cartesian coordinate system is shown in FIG. 1 for reference. In some examples, the exit tube 101 has a circular shape in the x-z plane. In some examples, the exit tube 101 has a radius 106 of 1.5 mm or greater (e.g., 1.6 mm or greater, 1.7 mm or greater, 1.8 mm or greater). In some examples, the exit tube 101 has a radius 106 of 2.0 mm or less (e.g., 1.9 mm or less, 1.8 mm or less, 1.7 mm or less). The microspeaker 100 has a center axis 120. The center axis 120 can be equidistant from edges of the microspeaker 120 in the x-direction and in the z-direction. The center axis 120 extends in a first, axial direction (e.g., the y-direction). In some examples, a center of the exit tube 101 aligns with the center axis 120 in the x-z plane.

Figure 2:
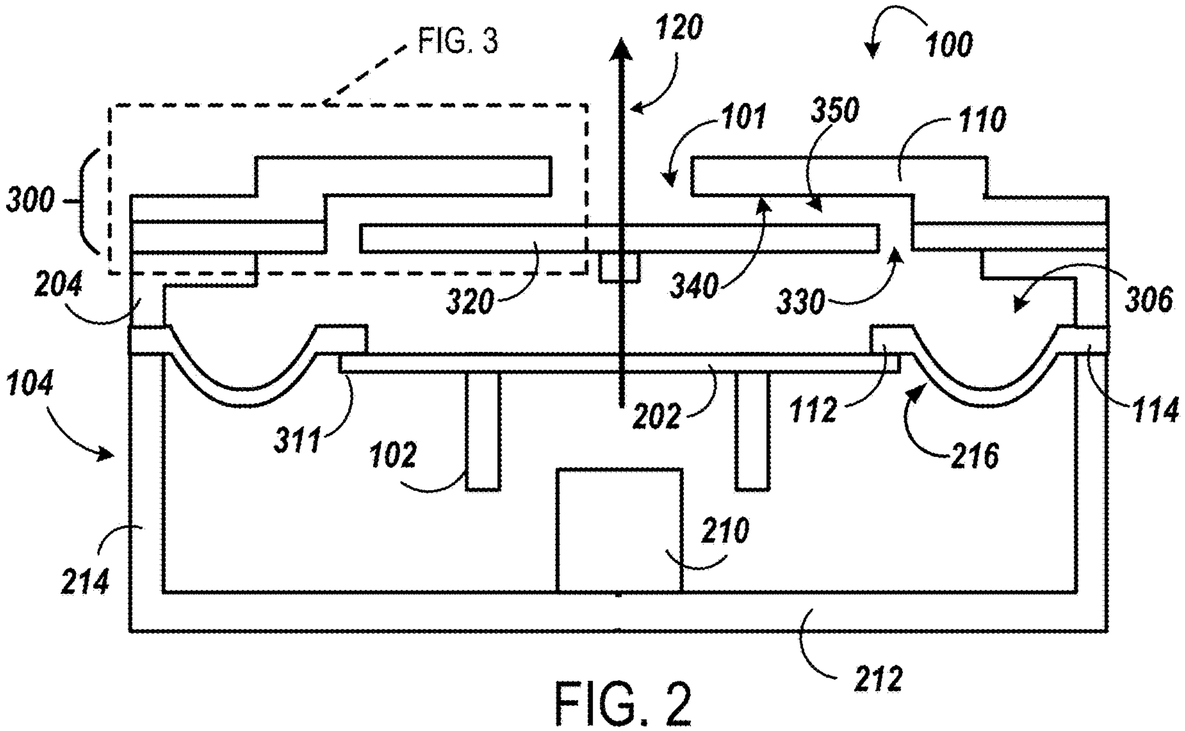
FIG. 2 is a cross-sectional view of an example microspeaker.

FIG. 2 is a cross-sectional view of an example microspeaker 100. The microspeaker 100 includes a compression driver actuator, which converts an electrical audio signal into a corresponding sound wave. Audio output is generated by a vibrating diaphragm 202 of the actuator. The microspeaker 100 includes a frame 104, a coil 102, and a suspension 216 that suspends the coil 102 and the diaphragm 202 within a space, or chamber, defined by the frame 104.

The coil 102 is positioned in the space such that the frame 104 extends around a perimeter of the coil 102. The suspension 216 suspends the diaphragm 202 and the coil 102 within the space relative to the frame 104. The suspension 216 attaches to the frame 104 and to the coil 102. The suspension 216 allows the coil 102 to vibrate in an axial direction, e.g., the y-direction, during operation of the microspeaker 100. During operation of the microspeaker 100, the frame 104 remains rigid, or substantially stationary, relative to the suspension 216 and to the coil 102.

The microspeaker 100 can be relatively compact. For example, the microspeaker, which has a substantially rectangular profile in the x-z plane, can have an edge length (i.e., in the x- and/or z-directions) of about 16 millimeters (mm) or less (e.g., 15 mm or less, 12 mm or less, 10 mm or less). The microspeaker's depth (i.e., its dimension in the y-direction) can be about 5.5 mm or less (e.g., 5.0 mm or less, 4.0 mm or less, 3.0 mm or less).

Generally, a reduced size of a microspeaker enables design flexibility. Specifically, dimensions (length by width by depth) of microspeakers for mobile devices can range from approximately 16 mm by 12 mm by 5.5 mm, to 9 mm by 8 mm by 2 mm. Dimensions may be, for example, 15 mm length by 11 mm width, or 12 mm length by 6 mm width. Other example dimensions may be 10 mm diameter, 9 mm diameter, or 11 mm diameter in the x-Z plane, with depth in the y-direction ranging from 5.5 mm to 2.2 mm. In some examples, a ratio of the length to the width is 1.5 or more. In some examples, a ratio of the length to the width is 2.0 or less.

In some examples, a bandwidth of the microspeaker 100 includes frequencies of 400 Hz or greater. In some examples, a bandwidth of the microspeaker 100 includes frequencies of 50 kHz or less. The microspeaker 100 may have a spatial volume ranging from approximately 150 cubic millimeters to 1.5 cubic centimeters. A power density of the microspeaker 100 may be, for example, 0.8 milliwatts per cubic millimeter ($mW/mm^3$) or greater (e.g., 0.9 $mW/mm^3$ or greater, 1.0 $mW/mm^3$ or greater). A power density of the microspeaker may be, for example, 2.0 $mW/mm^3$ or less (e.g., 1.8 $mW/mm^3$ or less, 1.6 $mW/mm^3$ or less).

The frame 104 has an approximately square or rectangular shape when viewed in the x-z plane. For example, an approximately square shape may have a ratio of length to width of 1.0 to 1.1. An approximately rectangular shape may have a ratio of length to width of 1.1 or greater. For example, an approximately rectangular shape may have a ratio of length to width of 3.0 or less, 2.0 or less, or 1.5 or less. Each corner of the frame can be curved or bent so that the frame has rounded or sharp corners. Between each of the corners of frame 104 are portions of the frame that are substantially straight along their outside edges.

The suspension 216 is mechanically coupled to frame 104 around the perimeter of the suspension 216. Although the frame 104 is depicted as having a quadrilateral shape in the x-z plane, other shapes are possible. For example, the frame 104 can have a shape that is substantially elliptical, circular, oval, or round. In some examples, the frame 104 has a shape with two opposing sides that are semicircular and two opposing sides that are straight. For example, the frame can have a shape similar to a shape of a racetrack.

The suspension 216 includes an inner ring 112 and an outer ring 114. A bottom surface of the inner ring 112 is mechanically coupled to a top surface of the diaphragm 202. Mechanical coupling can include coupling using an attachment means, e.g., an adhesive. The diaphragm surface area can measure approximately 0.15 square centimeters (cm). The outer ring 114 is mechanically coupled to the frame 104. The size of the inner ring 112 and outer ring 114 can be selected on the basis of providing adequate attachment to the diaphragm 202 and frame 104, respectively.

The coil 102 can be coupled directly to the suspension 216 or can be mechanically coupled to the diaphragm 202 and the diaphragm 202 can be mechanically coupled to the suspension 216. The suspension 216 can act as a bridge between the stationary frame 104 and the moving actuator including the diaphragm 202 and coil 102.

The microspeaker 100 includes a magnetic assembly 210 including one or more magnets. The magnets of the magnetic assembly 210 can be, for example, iron magnets, neodymium magnets, or ferrite magnets, such as magnets composed of iron and nickel. In some embodiments, the magnetic assembly 210 can include an electromagnet. In some embodiments, the magnetic assembly 210 can include high permeability materials.

The frame 104 can include a back plate 212. The magnetic assembly 210 can be supported by the back plate 212 of the frame 104. The back plate 212 extends in a plane, e.g., the x-z plane. The frame 104 includes a front plate 204 and side walls 214. The side walls 214 are mechanically coupled to the back plate 212 and extend in a direction orthogonal to the plane of the back plate 212.

During operation, an electric current is applied to the coil 102, which is located in a magnetic field of the magnetic assembly 210. When a variable current, e.g., an electrical audio signal, flows into the coil 102, a corresponding variable force is applied to the coil. The resulting magnetic flux causes vibration of the coil 102 in the axial direction. The diaphragm 202, attached to the coil 102, vibrates accordingly and produces a sound of amplitude proportional to the diaphragm deviation from the state of rest. The resulting vibrations of the diaphragm 202 generate sound waves. The diaphragm 202 oscillates to produce sound waves in the air and therefore to make audible sound. The microspeaker can generate human-audible sound waves, e.g., in the range of 20 Hz to 20 kHz. The microspeaker can generate human-inaudible sound waves, e.g., in the range of 20 kHz to 60 kHz.

The frame 104 defines a space 306. The diaphragm 202 is positioned in the space 306. The center axis 120 passes through a center of the diaphragm in the x-z plane 202 and extends in the axial direction (y-direction). When the diaphragm 202 oscillates in the axial direction during operation of the actuator, air is displaced from the space 306 defined by the frame 104 of the microspeaker 100.

The microspeaker 100 includes a plate assembly 300 that defines an air path 302 for venting air from the space 306. The plate assembly 300 taps air from regions of the microspeaker 100 around the edge 311, or periphery, of the diaphragm 202 in the x-z plane. Air pressure around the edges 311 of the diaphragm can be higher than air pressures at or near the center of the diaphragm 202, e.g., at or near the center axis 120. The center of the diaphragm 202 can be equidistant from edges of the diaphragm in the x-direction and in the z-direction. By tapping air from the edges 311 of the diaphragm, a smooth acoustic response can be achieved at a broad range of frequencies, including ultrasonic frequencies. The air tapped from the edges 311 of the diaphragm 202 is routed towards the center of the microspeaker 100, and exits through the exit tube 101.

The plate assembly 300 includes a first plate, e.g., vent plate 320. The vent plate 320 extends in a plane orthogonal to the axial direction, e.g., the x-z plane. The vent plate 320 defines one or more apertures, or vents 330. The vents 330 are offset from the center axis 120 in the x-z plane, such that the areas of the vents 330 are not intersected by the center axis 120 in the x-z plane.

The plate assembly 300 includes a second plate, e.g., top plate 110. The top plate 110 defines a second aperture, e.g., exit tube 101. The exit tube 101 is intersected by the center axis 120 in the x-z plane. In some examples, a center of the exit tube 101 aligns with the center axis 120 in the x-z plane.

In some examples, the plate assembly 300 is mechanically coupled to the side walls 214 of the frame 104. In some examples, the plate assembly 300 is rigidly attached to the side walls 214, e.g., using an adhesive. In some examples, the plate assembly 300 is mechanically coupled to the front plate 204, and the front plate 204 is mechanically coupled to the side walls 214 of the frame 104. The plate assembly 300 mechanically coupled to the frame 104 can form a frame assembly for the microspeaker 100.

Figure 3:
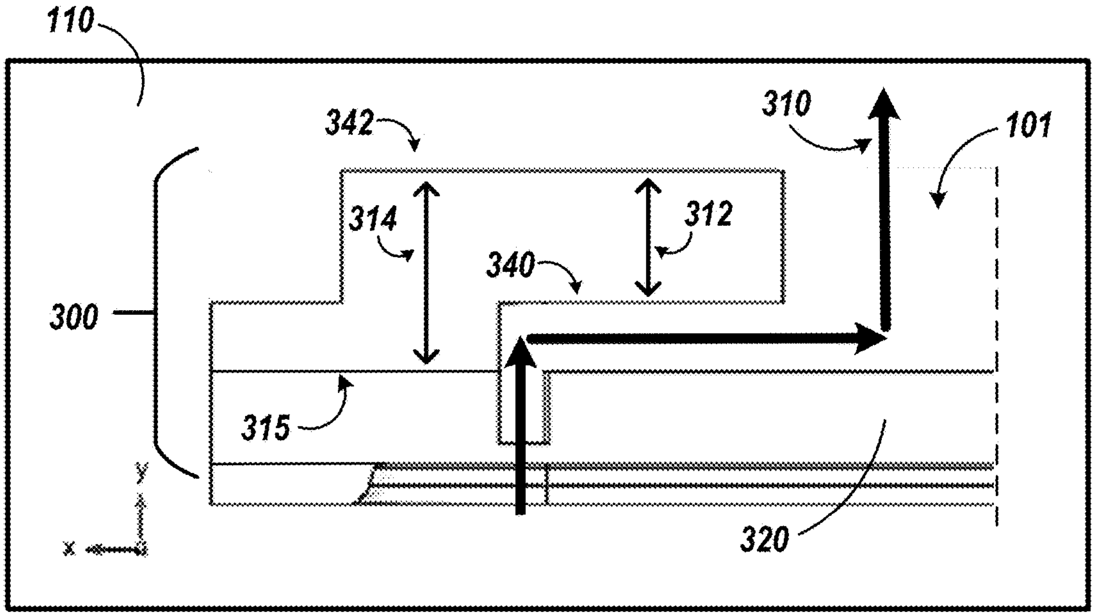
FIG. 3 is a cross-sectional view of a portion of a plate assembly defining an air path for venting air from the example microspeaker of FIG. 2.

FIG. 3 is a cross-sectional view of a portion of a plate assembly 300 defining an air path 310 for venting fluid from the example microspeaker 100 of FIG. 2. Referring to FIG. 3, the top plate 110 has a first side, e.g., bottom side 315. The bottom side 315 of the top plate 110 includes an inner region, or recessed region 340, abutting the exit tube 101. The recessed region 340 can be positioned around the exit tube 101. In some examples, the recessed region 340 surrounds the exit tube 101. The vent plate 320 is mechanically coupled to the top plate 110 with the bottom side 315 of the top plate 110 facing the vent plate 320.

At the recessed region 340, the top plate 110 has a first thickness 312 in the axial direction (y-direction). The top plate 110 includes an outer, non-recessed region 342 outside of the recessed region 340 and abutting the recessed region 340. In some examples, the recessed region 340 is positioned between the non-recessed region 342 and the exit tube 101. The non-recessed region 342 can be positioned around the recessed region 340. In some examples, the non-recessed region 342 surrounds the recessed region 340.

The recessed region 340 of the bottom side 315 is recessed relative to the non-recessed region 342. At the non-recessed region 342, the top plate 110 has a second thickness 314 in the axial direction. The second thickness 314 can be, for example 0.8 mm or less (0.7 mm or less, 0.6 mm or less, 0.5 mm or less). The second thickness 314 is greater than the first thickness 312. In some examples, a difference between the first thickness 312 and the second thickness 314 is 0.5 mm or less (e.g., 0.4 mm or less, 0.3 mm or less, 0.2 mm or less, 0.1 mm or less).

The vent plate 320 and the recessed region 340 of the top plate 110 define a channel 350. The channel 350 fluidly couples the vents 330 to the exit tube 101. Fluid coupling between the vents 330 and the exit tube 101 permits fluid, e.g., air, to flow from the vents 330, through the channel 350, to the exit tube 101. The plate assembly 300 thus defines an air path 310. The air path 310 is a path for venting fluid, e.g., air, from the space 306 defined by the frame 104.

Figure 4:
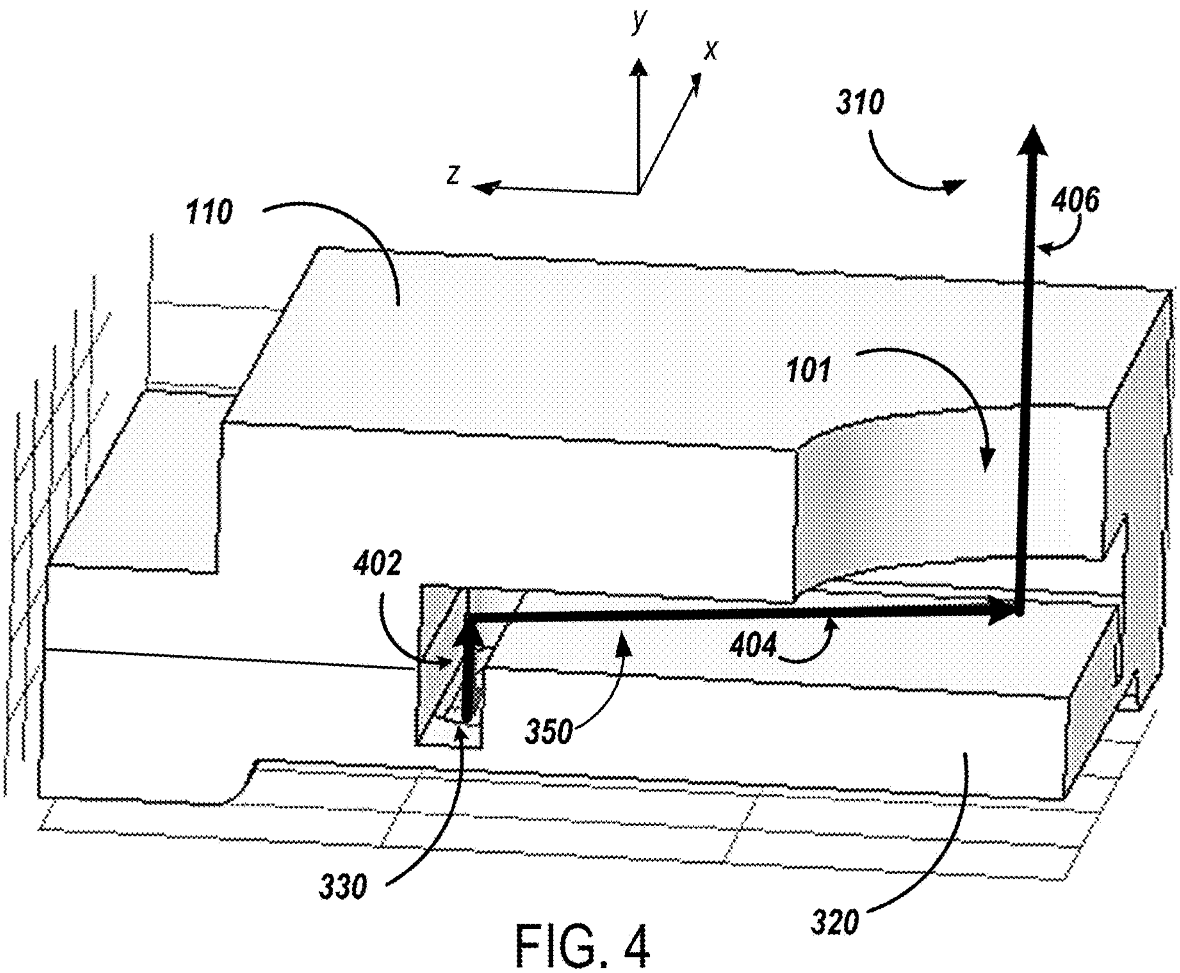
FIG. 4 is a perspective view of an air path of an example microspeaker.

FIG. 4 is a perspective view of an air path 310 of an example microspeaker. The air path 310 routes air from the space 306 around the edges 311 of the diaphragm 202 and funnels the air to the center through the channel 350. The air path 310 includes a first portion 402 defined by the vents of the vent plate, e.g., vent 330*a*. The air path 310 includes a second portion 404 defined by the channel 350 between the vent plate 320 and the recessed region 340 of the top plate 110. In some examples, the direction of fluid flow in the first portion 402 is orthogonal to the direction of fluid flow in the second portion 404. The air path 310 includes a third portion 406 defined by the exit tube 101. In some examples, the direction of fluid flow in the second portion 404 is orthogonal to the direction of fluid flow in the third portion 406. In some examples, the direction of fluid flow in the second portion 404 is in an inward radial direction relative to the center axis 120.

Figure 5:
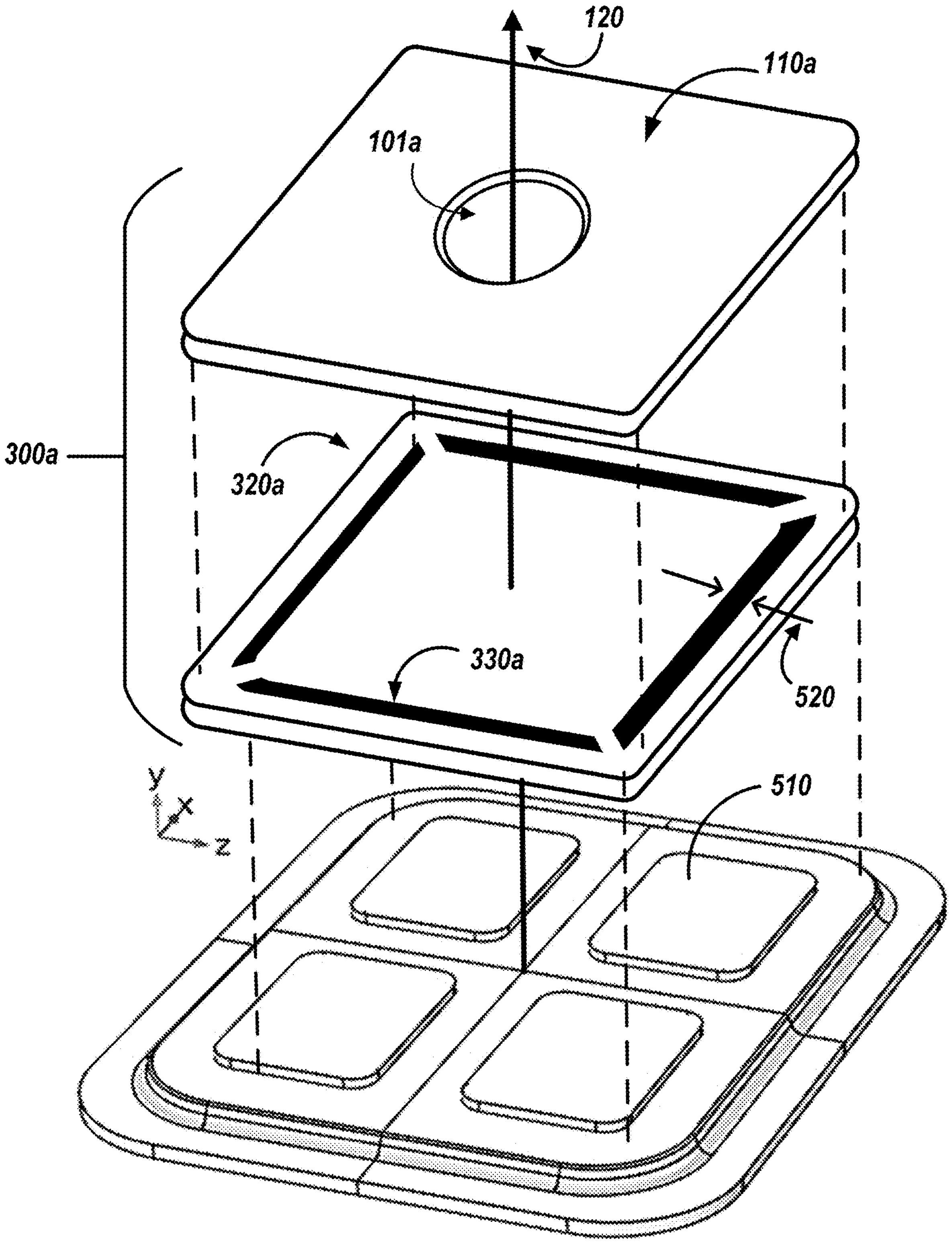
FIG. 5 is an exploded view of an example plate assembly of a microspeaker.

FIG. 5 is an exploded view of an example plate assembly 300*a* of a microspeaker 100*a*. The plate assembly 300*a* includes a top plate 110*a* and vent plate 320*a*. The top plate 110*a* defines an exit tube 101*a*. The vent plate 320*a* includes vents 330*a*. The vents 330 can be uniform in width 520. In some examples, the vents 330 each have a width 520 of 0.4 mm or less (e.g., 0.30 mm or less, 0.2 mm or less).

In some examples, a total cross-sectional area of the vents 330*a* is approximately equal to a cross sectional area of the exit tube 101*a*. In some examples, a ratio between the total cross-sectional area of the vents 330*a* and the cross-sectional area of the exit tube 101*a* is 0.9 or greater. In some examples, the ratio between the total cross-sectional area of the vents 330*a* and the cross-sectional area of the exit tube 101*a* is 1.1 or less. In some examples, the cross-sectional area of the exit tube 101*a* is approximately 8 square millimeters (mm2) (e.g., 8.4 mm2 or less, 8.3 mm2 or less, 7.6 mm2 or less, 7.2 mm2 or less).

In some examples, vibration of the diaphragm 202 can create air pockets 510. In the example of FIG. 5, four air pockets 510 are separated from each other by the front plate 204. The vents 330*a* channel air from outside edges of the air pockets 510 to the channel 350.

Figure 6A:
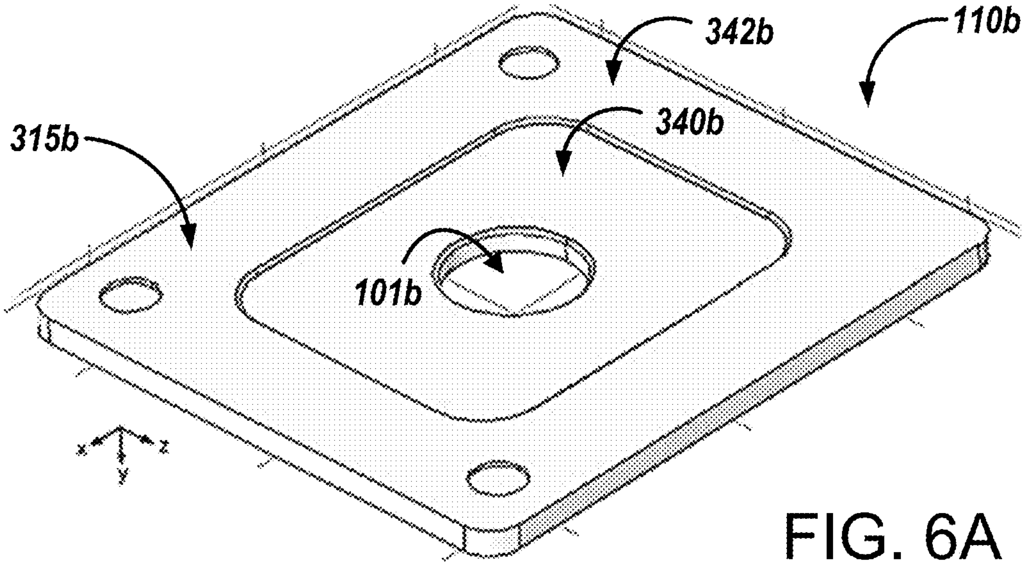
FIG. 6A is a perspective view of an example top plate of a microspeaker.
Figure 6B:
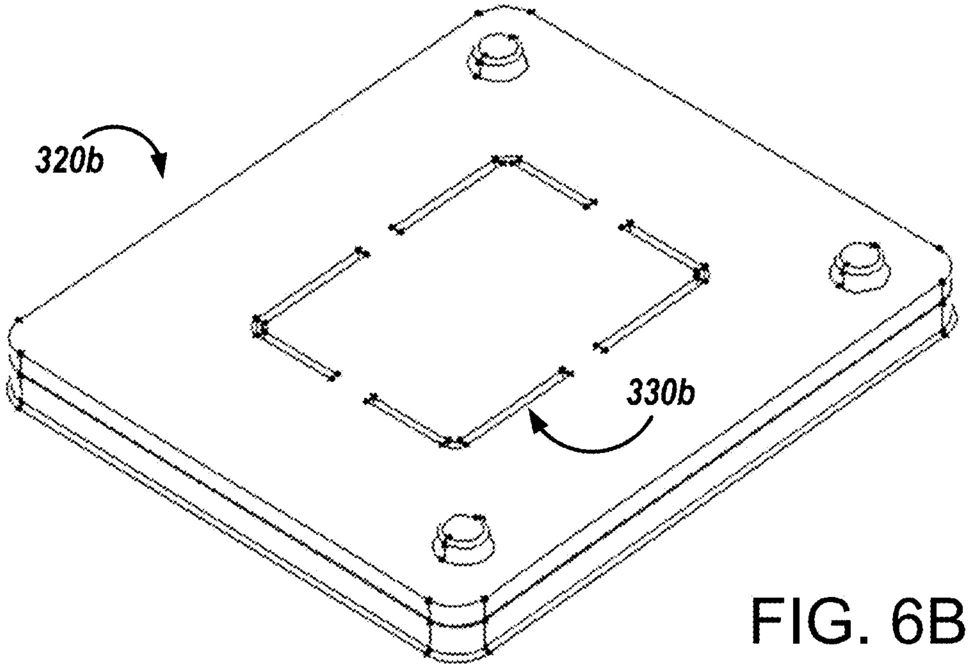
FIG. 6B is a perspective view of an example vent plate of a microspeaker.

FIG. 6A is a perspective view of an example top plate 110*b* of a microspeaker. FIG. 6B is a perspective view of an example vent plate 320*b* of a microspeaker. The top plate 110*b* has a bottom side 315*b* with an inner, recessed region 340*b* and an outer, non-recessed region 342*b*. The recessed region 340*b* of the bottom side 315*b* is recessed relative to the non-recessed region 342*b*. The top plate 110*b* defines an exit tube 101*b*.

The vent plate 320*a* includes vents 330*b*. In some examples, the vents 330*b* of the vent plate 320 are arranged to form a rectangular shape in the plane. Each of the vents 330*b* can form a portion of a perimeter of the rectangular shape. The top plate 110 can be mechanically coupled to the vent plate 320*b* with the bottom side 315*b* facing the vent plate 320*b*. In some examples, when the top plate 110 is mechanically coupled to the vent plate 320*b*, the outer edge of the recessed region 340*b* of the top plate 110*b* aligns with an outer edge of the vents 330*b* in the axial direction.

Figure 7A:
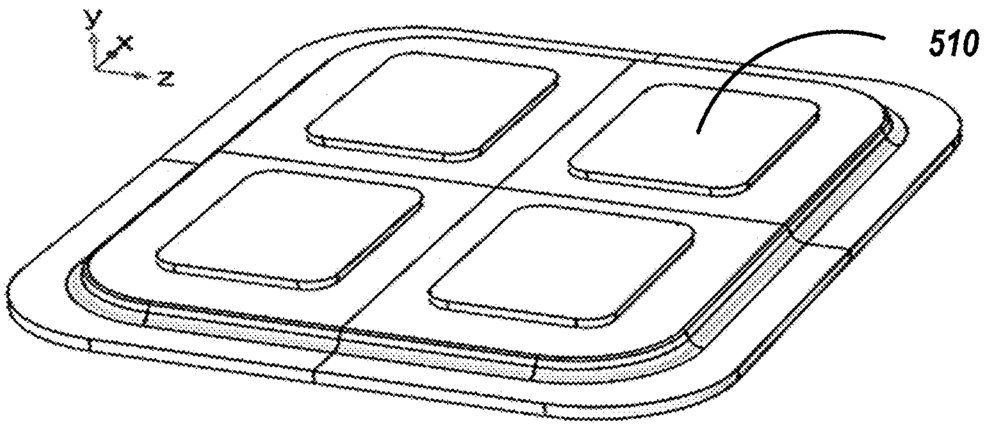
FIGS. 7A to 7C show example air pockets and air paths within a microspeaker.
Figure 7B:
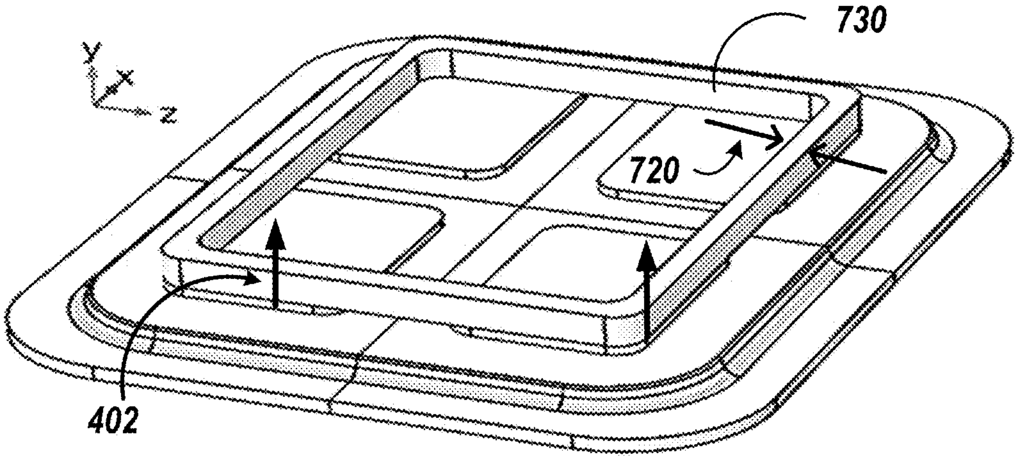
Figure 7C:
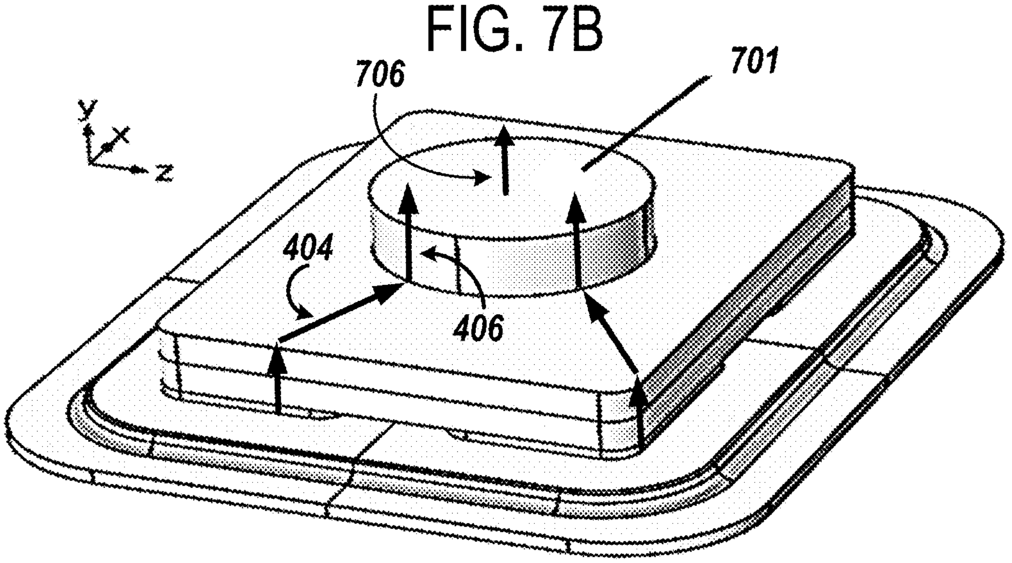

FIGS. 7A to 7C show example air pockets and paths within a microspeaker. The air paths within the microspeaker flow from outside edges of the diaphragm 202 inwards to the center of the microspeaker and out of the top of the microspeaker.

FIG. 7A shows air pockets 510 created by vibration of the diaphragm 202. FIG. 7B shows an edge air interface 730 aligned with edges of the air pockets 510. The edge air interface 630 has a width 720 that corresponds to the width 520 of the vents 330. Air in the edge air interface 730 flows through the vents 330 and along the first portion 402 of the air path 302.

Referring to FIG. 7C, air flows along the second portion 404 of the air path through the channel 350 between the vents 330 to the exit tube 101. FIG. 7C shows a center air interface 701. The center air interface 701 has a radius 706 that corresponds to the radius 106 of the exit tube 101. Air in the center air interface 701 flows through the exit tube 101 and along the third portion 406 of the air path 302.

Figure 8A:
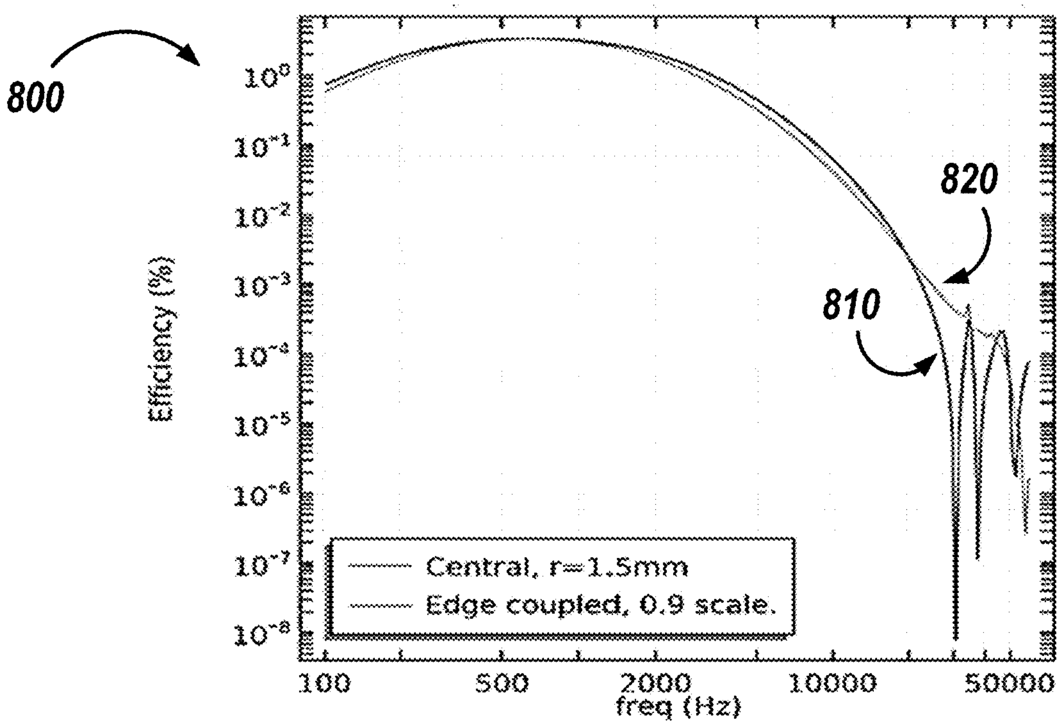
FIGS. 8A and 8B show graphs of efficiency vs. frequency for an example microspeaker.
Figure 8B:
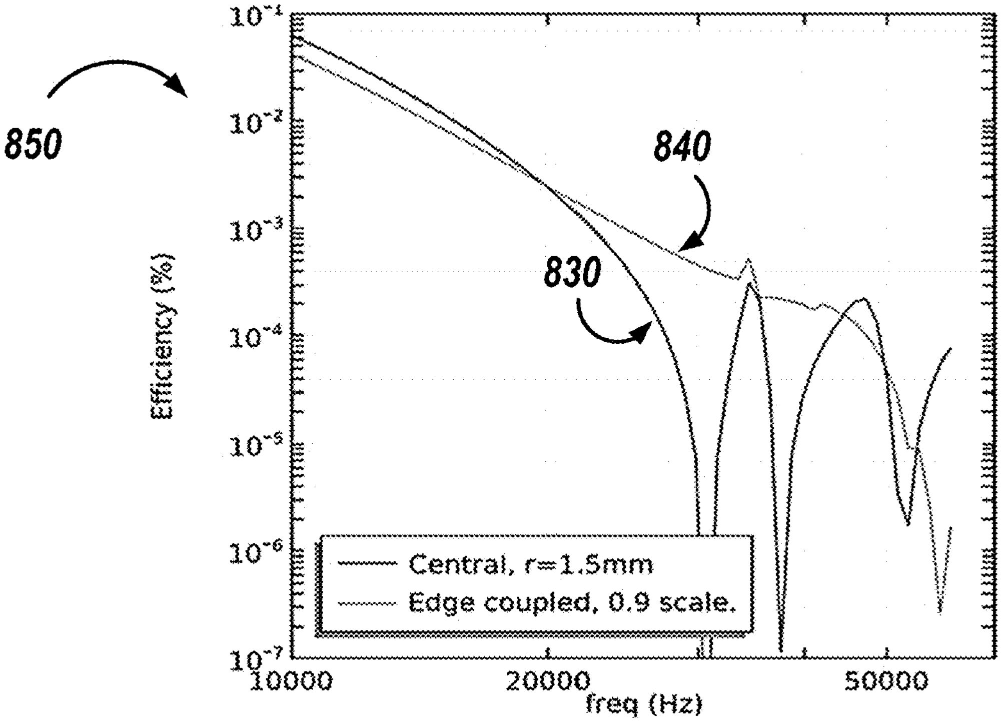

FIGS. 8A and 8B show graphs of efficiency vs. frequency for microspeakers. FIG. 8A shows a graph 800 of efficiency vs. frequency over a range of lower frequencies, e.g., frequencies of 20 kHz and lower. The graph 800 includes a first curve 810 for a microspeaker with an air tap near the center of the diaphragm. The graph 800 includes a second curve 820 for a microspeaker with an air tap near the edges of the diaphragm, e.g., microspeaker 100. As shown in the graph 800, audio efficiency is approximately the same for the center-tapped microspeaker and the edge-tapped microspeaker for the lower frequencies.

FIG. 8B shows a graph 850 of efficiency vs. frequency over a range of higher frequencies, e.g., frequencies of 20 kHz and greater. The graph 850 includes a third curve 830 for the microspeaker with the air tap near the center of the diaphragm, and a fourth curve 840 for the microspeaker with the air tap near the edges of the diaphragm. As shown in the graph 850, audio efficiency is greater for the edge-tapped microspeaker than for the center-tapped microspeaker for the higher frequencies. Thus, ultrasonic efficiency shows great improvement with an edge-tapped microspeaker compared to the center-tapped microspeaker. Efficiency for certain frequencies can be improved by up to four orders of magnitude or more. In some examples, the edge-tapped microspeaker can have a sound pressure level gain of 50 decibels or more at certain frequencies. The curve 840 shows no nulls between 20 kHz and 50 kHz. Sound amplitude and phase are controlled over a large range of high frequencies for the edge-tapped microspeaker.

While the foregoing figures cover a specific embodiment of a microspeaker i.e., microspeaker 100, more generally the principles embodied in this example can be applied in other designs too. For example, while microspeaker 100 has a substantially rectangular footprint (i.e., in the x-z plane), other shapes are possible, such as substantially square, oval, circular, or round.

Figure 9:
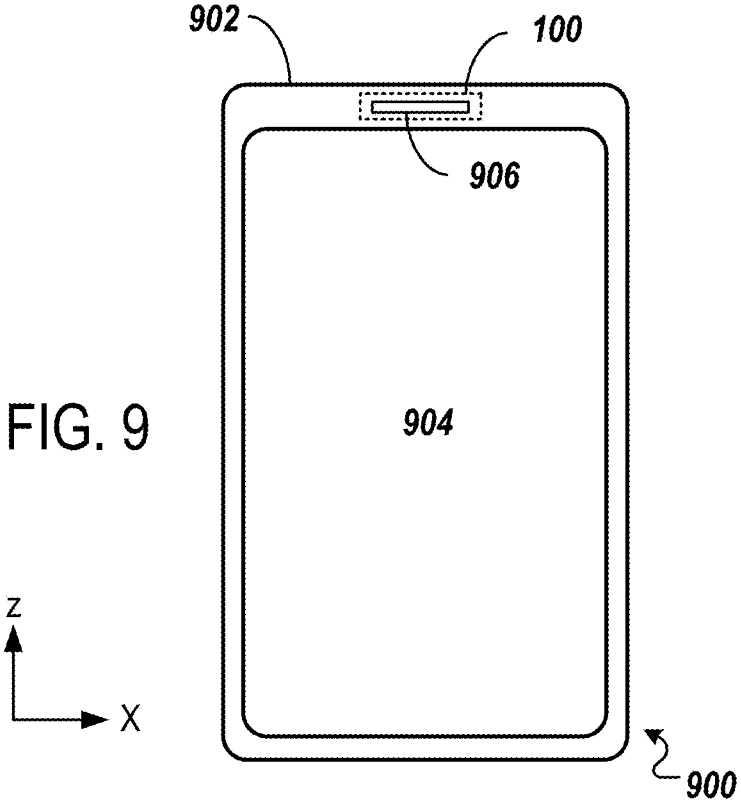
FIG. 9 is an overhead view of an embodiment of a mobile device including a microspeaker.

In general, the microspeakers described above can be used in a variety of applications. For example, in some embodiments, microspeaker 100 can be integrated into a mobile device, such as a mobile phone. For example, referring to FIG. 9, a mobile device 900 includes a device chassis 902 and a display panel 904 including a flat panel display (e.g., an OLED or LCD display panel). Mobile device 900 interfaces with a user in a variety of ways, including by displaying images and receiving touch input via display panel 904. Typically, a mobile device has a depth (in the y-direction) of approximately 10 mm or less, a width (in the x-direction) of 60 mm to 80 mm (e.g., 68 mm to 72 mm), and a height (in the z-direction) of 100 mm to 160 mm (e.g., 138 mm to 144 mm).

Mobile device 900 also produces audio output. During operation, the mobile device 900 uses a speaker, e.g., microspeaker 100, to generate audible sound for a user, to generate inaudible ultrasonic sound waves, or both. The microspeaker 100 can transmit and/or receive energy in a wide range of frequencies. For example, the microspeaker 100 can transmit and/or receive ultrasonic energy. The ultrasonic energy can be used, for example, to perform range detection and facial recognition. The microspeaker 100 can output sound from voice telephone calls, recorded sound (e.g., voice messages, music files, etc.), sound generated by applications operating on mobile device 900, or any combination of these. Audio output from the microspeaker exits the chassis 902 through an aperture 906. The aperture 906 can be an opening in the chassis 902 or panel 904.

Figure 10A:
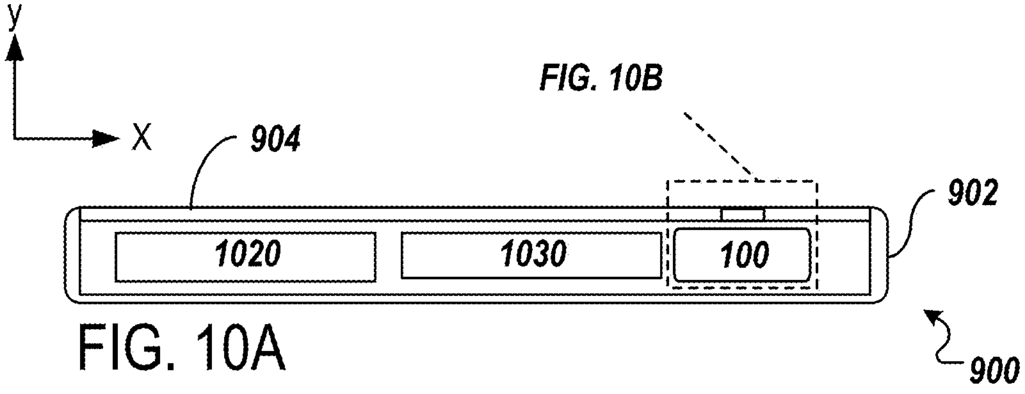
FIGS. 10A and 10B are schematic cross-sectional views of the mobile device of FIG. 9.

Referring to FIG. 10A, a cross-section of mobile device 900 illustrates device chassis 902 and display panel 904. Device chassis 902 has a depth measured along the y-direction and a width measured along the x-direction. Device chassis 902 also has a back panel, which is formed by the portion of device chassis 902 that extends primarily in the x-z plane. Mobile device 900 includes microspeaker 100, which is housed in chassis 902. Generally, microspeaker 100 is sized to fit within a volume constrained by other components housed in the chassis 902, including an electronic control module 1020 and a battery 1030.

Figure 10B:
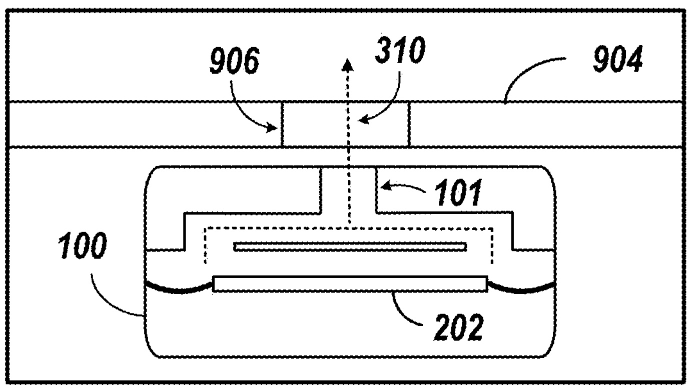

Referring to FIG. 10B, the microspeaker 100 is positioned in the chassis 902, under the panel 104, adjacent to the aperture 906. In some examples, the aperture 906 overlaps with the exit tube 101 in the y-direction. In some examples, a center axis of the exit tube 101 aligns with a center axis of the aperture 906 in the x-z plane. A cross section of the aperture 906 can be greater than, less than, or equal to a cross section of the exit tube 101.

During operation, air from regions of the microspeaker 100 around the edges of the diaphragm 202 travels along air path 310, as described with reference to FIGS. 3 and 4. The air traveling along the air path 310 exits the microspeaker 101 through the exit tube 101. The air then exits the chassis 902 through the aperture 906.

Although FIGS. 10A and 10B show microspeaker 100 as an internal component of mobile device 900, it should be appreciated that microspeaker 100 can also be implemented as an external and/or independent device. For instance, microspeaker 100 can be a stand-alone speaker that communicates with mobile device 900 using a wireless technology standard, such as Bluetooth, to output audio generated from the mobile device 900. The disclosed techniques are applicable to larger scale transducers, such as home speakers, automotive speakers, and the like.

In general, the disclosed speakers are controlled by an electronic control module, e.g., electronic control module 1020. In general, electronic control modules are composed of one or more electronic components that receive input from one or more sensors and/or signal receivers of the mobile phone, process the input, and generate and deliver signal waveforms that cause microspeaker 100 to provide audio output.

Figure 11:
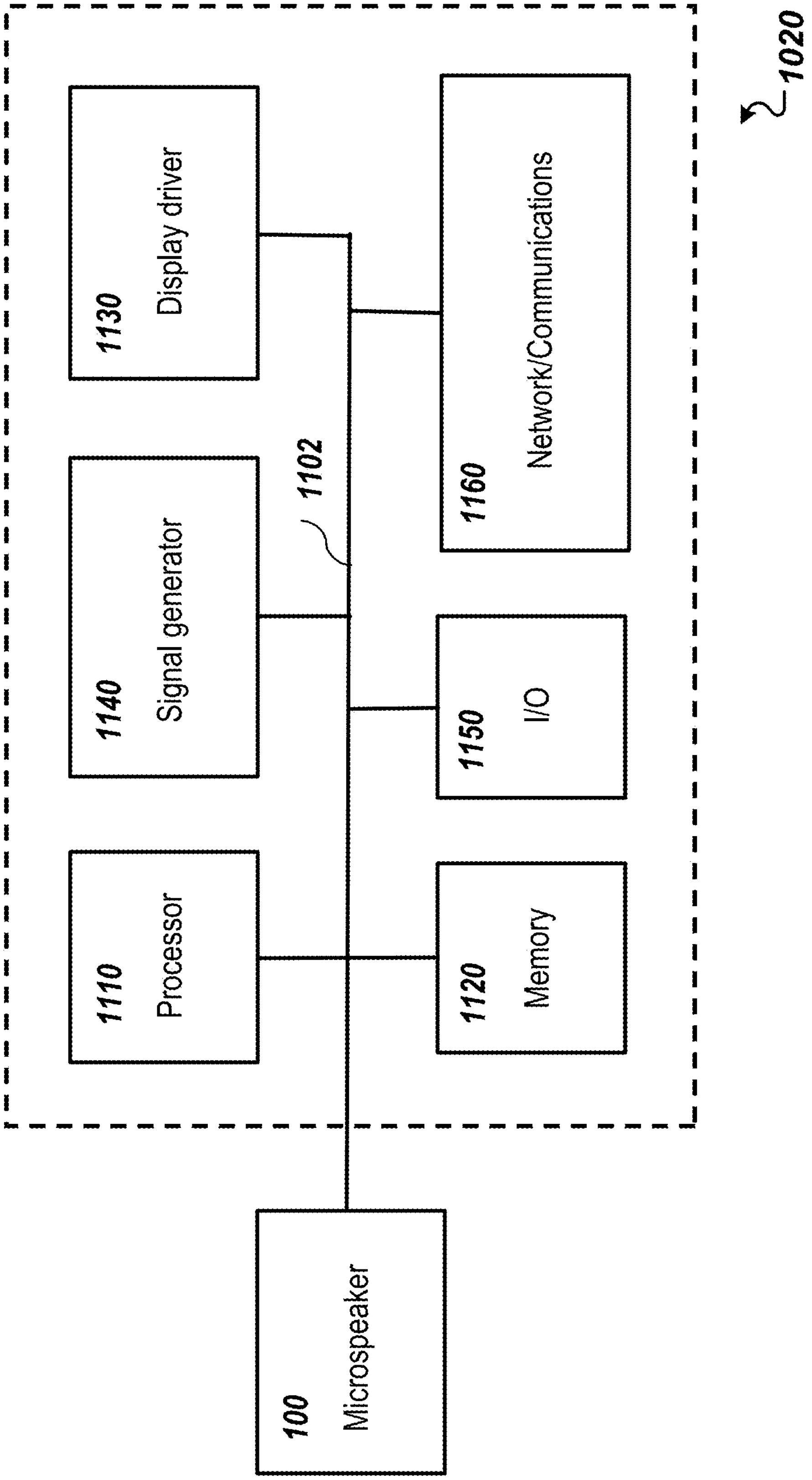
FIG. 11 is a schematic diagram of an embodiment of an electronic control module for a mobile device.

Referring to FIG. 11, an exemplary electronic control module 1020 of a mobile device, such as mobile device 900, includes a processor 1110, memory 1120, a display driver 1130, a signal generator 1140, an input/output (I/O) module 1150, and a network/communications module 1160. These components are in electrical communication with one another (e.g., via a signal bus 1102) and with microspeaker 100.

Processor 1110 may be implemented as any electronic device capable of processing, receiving, or transmitting data or instructions. For example, processor 1110 can be a microprocessor, a central processing unit (CPU), an application-specific integrated circuit (ASIC), a digital signal processor (DSP), or combinations of such devices.

Memory 1120 has various instructions, computer programs or other data stored thereon. The instructions or computer programs may be configured to perform one or more of the operations or functions described with respect to the mobile device. For example, the instructions may be configured to control or coordinate the operation of the device's display via display driver 1130, signal generator 1140, one or more components of I/O module 1150, one or more communication channels accessible via network/communications module 1160, one or more sensors (e.g., biometric sensors, temperature sensors, accelerometers, optical sensors, barometric sensors, moisture sensors and so on), and/or microspeaker 100.

Signal generator 1140 is configured to produce AC waveforms of varying amplitudes, frequency, and/or pulse profiles suitable for microspeaker 100 and producing acoustic and/or haptic responses via the actuator. Although depicted as a separate component, in some embodiments, signal generator 1140 can be part of processor 1110. In some embodiments, signal generator 1140 can include an amplifier, e.g., as an integral or separate component thereof.

Memory 1120 can store electronic data that can be used by the mobile device. For example, memory 1120 can store electrical data or content such as, for example, audio and video files, documents and applications, device settings and user preferences, timing and control signals or data for the various modules, data structures or databases, and so on. Memory 1120 may also store instructions for recreating the various types of waveforms that may be used by signal generator 1140 to generate signals for microspeaker 100. Memory 1120 may be any type of memory such as, for example, random access memory, read-only memory, Flash memory, removable memory, or other types of storage elements, or combinations of such devices.

As briefly discussed above, electronic control module 1020 may include various input and output components represented in FIG. 11 as I/O module 1150. Although the components of I/O module 1150 are represented as a single item in FIG. 11, the mobile device may include a number of different input components, including buttons, microphones, switches, and dials for accepting user input. In some embodiments, the components of I/O module 1150 may include one or more touch sensors and/or force sensors. For example, the mobile device's display may include one or more touch sensors and/or one or more force sensors that enable a user to provide input to the mobile device.

Each of the components of I/O module 1150 may include specialized circuitry for generating signals or data. In some cases, the components may produce or provide feedback for application-specific input that corresponds to a prompt or user interface object presented on the display.

As noted above, network/communications module 1160 includes one or more communication channels. These communication channels can include one or more wireless interfaces that provide communications between processor 1110 and an external device or other electronic device. In general, the communication channels may be configured to transmit and receive data and/or signals that may be interpreted by instructions executed on processor 1110. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

In some implementations, one or more of the communication channels of network/communications module 1160 may include a wireless communication channel between the mobile device and another device, such as another mobile phone, tablet, computer, or the like. In some cases, output, audio output, haptic output or visual display elements may be transmitted directly to the other device for output. For example, an audible alert or visual warning may be transmitted from the mobile device 900 to a mobile phone for output on that device and vice versa. Similarly, the network/communications module 1160 may be configured to receive input provided on another device to control the mobile device. For example, an audible alert, visual notification, or haptic alert (or instructions therefor) may be transmitted from the external device to the mobile device for presentation.

The actuator technology disclosed herein can be used in a device such as a smartphone, tablet computer, or wearable devices (e.g., smartwatch or head-mounted device, such as smart glasses).

Other embodiments are in the following claims.

What is claimed is:

1. A microspeaker, comprising:

a frame defining a space;

an actuator positioned within the space, the actuator including a diaphragm configured to vibrate in a first direction during operation of the actuator, wherein a center axis of the diaphragm extends in the first direction; and a plate assembly mechanically coupled to the frame and defining a path for venting fluid from the space, the plate assembly comprising:

a first plate extending in a plane orthogonal to the first direction, the first plate defining one or more first apertures, the one or more first apertures being offset from the center axis in the plane; and a second plate defining a second aperture intersected by the center axis, a first side of the second plate including:

an inner region abutting the second aperture; and an outer region abutting the inner region, the inner region being recessed relative to the outer region, wherein the first plate is mechanically coupled to the second plate with the first side of the second plate facing the first plate, the first plate and the inner region of the second plate defining a channel that fluidly couples the one or more first apertures to the second aperture.

2. The microspeaker of claim 1, wherein the path for venting fluid from the space comprises:

a first portion defined by the one or more first apertures;

a second portion defined by the channel; and a third portion defined by the second aperture.

3. The microspeaker of claim 2, wherein a direction of fluid flow in the first portion of the path is orthogonal to a direction of fluid flow in the second portion of the path and the direction of fluid flow in the second portion of the path is orthogonal to a direction of fluid flow in the third portion of the path.

4. The microspeaker of claim 1, wherein a center of the second aperture aligns with the center axis of the diaphragm in the first direction and the direction of fluid flow in the channel is in an inward radial direction relative to the center axis.

5. The microspeaker of claim 1, wherein a ratio between a total cross-sectional area of the one or more first apertures and a cross-sectional area of the second aperture is 0.9 or greater and 1.1 or less.

6. The microspeaker of claim 1, wherein the second aperture has a radius of 1.5 mm or greater and 2.0 mm or less.

7. The microspeaker of claim 1, comprising:

a suspension suspending the diaphragm within the space relative to the frame; and a coil positioned in the space with the frame extending around a perimeter of the coil, the coil being coupled to the diaphragm, wherein during operation of the microspeaker, an electric current through the coil varies a relative displacement of the coil and of the diaphragm with respect to the frame in the first direction.

8. The microspeaker of claim 1, wherein a bandwidth of the microspeaker includes frequencies of 400 Hz or greater and 50 kHz or less.

9. A mobile device, comprising the microspeaker of claim 1.

10. A wearable device, comprising the microspeaker of claim 1.

11. A frame assembly for a microspeaker, the frame assembly comprising:

a back plate extending in a plane;

one or more side walls mechanically coupled to the back plate and extending in a first direction orthogonal to the plane, the back plate and the one or more side walls defining a space; and a plate assembly mechanically coupled to the one or more side walls and defining a path for venting fluid from the space, the plate assembly having a center axis that extends in the first direction, the plate assembly comprising:

a first plate extending parallel to the back plate and defining one or more first apertures, the one or more first apertures being offset from the center axis; and a second plate defining a second aperture intersected by the center axis, a first side of the second plate including:

an inner region abutting the second aperture; and an outer region abutting the inner region, the inner region being recessed relative to the outer region, wherein the first plate is mechanically coupled to the second plate with the first side of the second plate facing the first plate, the first plate and the inner region of the second plate defining a channel that fluidly couples the one or more first apertures to the second aperture.

12. The frame assembly of claim 11, wherein the path for venting fluid from the space comprises:

a first portion defined by the one or more first apertures;

a second portion defined by the channel; and a third portion defined by the second aperture.

13. The frame assembly of claim 12, wherein a direction of fluid flow in the first portion of the path is orthogonal to a direction of fluid flow in the second portion of the path and the direction of fluid flow in the second portion of the path is orthogonal to a direction of fluid flow in the third portion of the path.

14. The frame assembly of claim 11, wherein a center of the second aperture aligns with the center axis of the plate assembly in the first direction and a direction of fluid flow in the channel is in an inward radial direction relative to the center axis.

15. The frame assembly of claim 11, wherein each of the one or more first apertures has a width of 0.4 mm or less.

16. The frame assembly of claim 11, wherein a ratio between a total cross-sectional area of the one or more first apertures and a cross-sectional area of the second aperture is 0.9 or greater and 1.1 or less.

17. The frame assembly of claim 11, wherein;

the second aperture has a circular shape;

the one or more first apertures are arranged to form a rectangular shape in the plane, each of the one or more first apertures forming a portion of a perimeter of the rectangular shape; and an outer edge of the inner region of the first side of the second plate aligns with an outer edge of the one or more first apertures in the first direction.

18. The frame assembly of claim 11, wherein:

at the inner region, the second plate has a first thickness; and at the outer region, the second plate has a second thickness that is greater than the first thickness, a difference between the first thickness and the second thickness being 0.5 mm or less.

19. The frame assembly of claim 11, wherein the second aperture has a radius of 1.5 mm or greater and 2.0 mm or less.

20. A microspeaker, comprising the frame assembly of claim 11.

* * * * *